United States Patent
Reno

(10) Patent No.: US 7,363,262 B2
(45) Date of Patent: Apr. 22, 2008

(54) ACCOUNT PROTECTION WITH ONE SIDED ACCESS

(75) Inventor: James D. Reno, Scotts Valley, CA (US)

(73) Assignee: Arcot Systems, Inc., Sunnyvale, CA (US)

( * ) Notice: Subject to any disclaimer, the term of this patent is extended or adjusted under 35 U.S.C. 154(b) by 153 days.

(21) Appl. No.: 11/011,875

(22) Filed: Dec. 13, 2004

(65) Prior Publication Data

US 2005/0160043 A1 Jul. 21, 2005

Related U.S. Application Data

(60) Provisional application No. 60/537,981, filed on Jan. 20, 2004.

(51) Int. Cl.
*G06Q 99/00* (2006.01)

(52) U.S. Cl. .............................. 705/30; 705/32; 705/50

(58) Field of Classification Search ................. 705/30, 705/32, 50
See application file for complete search history.

(56) References Cited

U.S. PATENT DOCUMENTS

2002/0174048 A1* 11/2002 Dheer et al. .................. 705/36

FOREIGN PATENT DOCUMENTS

JP 2005251087 A * 9/2005

\* cited by examiner

*Primary Examiner*—Pierre Eddy Elisca
(74) *Attorney, Agent, or Firm*—Townsend and Townsend and Crew LLP

(57) ABSTRACT

A first account number and a second account number are created for an account. The first and second account numbers are associated with the account and can be used for transactions with the account. A first subset of operations is associated with the first account number and a second subset of operations is associated with the second account number. A subset of operations includes operations that are restricted to a party that has access to the account number. Accordingly, the first party that has access to the first account number is restricted to the operations found in the first subset of operations when transacting with the account. Also, a second party that has access to the second account number is restricted to the second subset of operations when transacting with the account.

2 Claims, 3 Drawing Sheets

ACCOUNT PROTECTION WITH ONE SIDED ACCESS

CROSS-REFERENCES TO RELATED APPLICATIONS

This application claims priority from co-pending U.S. Provisional Patent Application No. 60/537,981 filed Jan. 20, 2004 entitled ACCOUNT PROTECTION WITH ONE SIDED ACCESS which is hereby incorporated by reference, as if set forth in full in this document, for all purposes.

BACKGROUND OF THE INVENTION

The present invention generally relates to account protection and more specifically to methods and apparatus for restricting access to an account using different account numbers associated with different subsets of operations.

An account number is typically exchanged when a transaction between two parties is being performed. For example, an account holder may enter into a transaction with another party in which the account holder's account number is given to the other party. The party can then use the account number to perform transactions with the user's account. For example, the party can request operations such as depositing money, withdrawing money, etc. It should be noted that the transactions may not always be financial in nature. For example, the transaction may be depositing a document in an account, requesting access to information in an account, etc.

With the advent of the Internet, some transactions may not be face to face. For example, an account holder may be transacting with a party that is only known through a website to the account holder. Additionally, when account numbers are revealed in transactions, they may be susceptible to being intercepted by other parties independent of the transaction. This makes revealing an account number to another party more susceptible to fraud. Also, even in face-to-face transactions, any time an account number is revealed to another party, fraud may occur. Accordingly, the other party may exploit the information that is revealed in order to request operations that are not desired by the account holder. For example, instead of depositing money into the account holder's account, the party may withdraw money.

Often the intent of providing an account number to another party is to facilitate the receipt of funds or information. For example, suppose party A wishes to send funds (make a payment) to party B. Party B may provide his account number in order that Party A can effect the transaction electronically, thus transferring the funds more efficiently and quickly than through other methods. An example of this is wire transfer of money. Other examples include systems managing things other than money, such as documents, pictures, or even physical objects.

The risk of these systems is that in current practice a single account number is used for complete access to the account. Thus, if Party B reveals his one and only account number to Party A (in order to facilitate a deposit), Party B risks that Party A may also conduct unauthorized withdrawals. Also, the use of only a single number for all transactions of all types provides no secure way to distinguish between those transactions. If Party A performs a transaction but in doing so claims to be Party C, Party B has no way to know it was really Party A.

BRIEF SUMMARY OF THE INVENTION

The present invention generally relates to protecting accounts. In one embodiment, a first account number and a second account number are created for an account. The first and second account numbers are associated with the account and can be used for transactions with the account. A first subset of operations is associated with the first account number and a second subset of operations is associated with the second account number. A subset of operations includes operations that are restricted to a party that has access to the account number. Accordingly, the first party that has access to the first account number is restricted to the operations found in the first subset of operations when transacting with the account. Also, a second party that has access to the second account number is restricted to the second subset of operations when transacting with the account. Accordingly, an entity may provide different account numbers to different parties, depending on the access the entity desires for the party. Thus, an account would be protected from certain parties.

Many account numbers may be used to provide different subsets of operations to different parties and to allow for secure tracking of transactions to the parties performing them. The operations allowed by a particular account number may be controlled according to different characteristics. These include, but are not limited to, time; amount; number of uses; or location. For example, an account number may be provided that allows for withdrawals but only under a certain dollar amount; or during specified times; or at specified locations; or some combination of all of these. By providing different numbers to different parties, the account owner can also reliably track who conducted specific transactions.

In one embodiment, a method of protecting an account is provided. The method comprises: creating a first account number and a second account number for an entity; associating the first and second account numbers with the account; storing an indication of a first subset of operations that should be restricted to the first account number; storing an indication of a second subset of operations that should be restricted to the second account number; enabling access to the account using the first subset of operations if the first account number is received in a transaction request; and enabling access to the account using the second subset of operations if the second account number is received in a transaction request.

In another embodiment, an account configured to have transactions processed from it is provided. The account comprises: a first account identifier associated with a first subset of operations; and a second account identifier associated with a second subset of operations, wherein a first party using the first account identifier can access the account using operations only found in the first subset of operations, wherein a second party using the second account identifier can access the account using operations only found in the second subset of operations.

A further understanding of the nature and the advantages of the inventions disclosed herein may be realized by reference of the remaining portions of the specification.

DETAILED DESCRIPTION OF THE INVENTION

Figure 1:
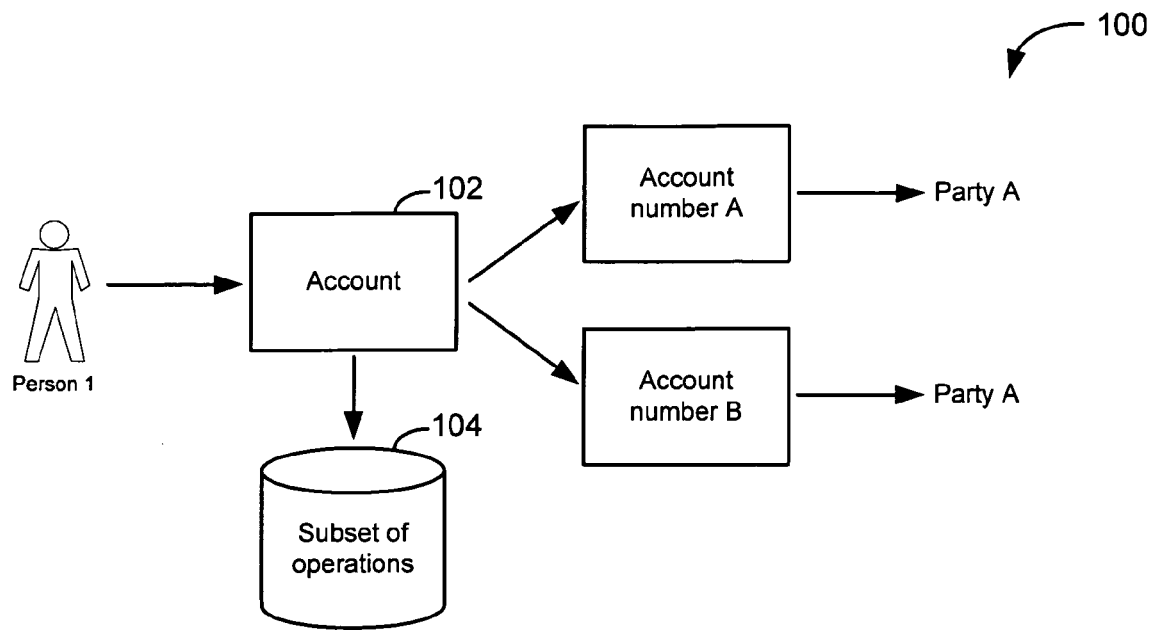
FIG. 1 depicts a system for protecting an account according to one embodiment of the present invention.

FIG. 1 depicts a system 100 for protecting an account 102 according to one embodiment of the present invention. Account 102 is associated with an account number A and an account number B. While account number A and account number B are described, it will be understood that any number of account numbers may be used. When account number "A" is used, it will be recognized that account number A is a first account number and account number B is a second account number that is different from account number A. For example, account number A may be "12345" and account number B may be "2468".

Account number A and account number B may be different but they are associated with the same account 102. Accordingly, when either account number A or account number B are used in a transaction, account 102 is used in processing the transaction. In one embodiment, account number A and account number B cannot be derived from each other. Thus, a user provides account number A to a party can be assured that the party cannot derive account number B from account number A.

Account 102 may be any account where transactions may be processed from. Account 102 includes resources. Resources may be monetary, information, or any anything a user might want to share with another party. For example, account 102 may be a financial account, such as a bank account (checking, savings, money market), a stock brokerage account, or any other account. Also, account 102 may be a non-financial account. For example, account 102 may be an on-line depository (e.g., for deposit of intellectual ideas). An on-line depository may be configured to receive the deposit of information, etc. For example, publications may be submitted to account 102 for deposit. Also, the publications may be accessed from account 102.

Account number A is associated with a first subset of operations. The first subset of operations restricts access to account 102 to the operations found in the subset of operations. For example, the first subset of operations may be limited to deposit operations. Thus, only deposit operations may be allowed when account number A is used.

Account number B may be associated with a second subset of operations. In one embodiment, the second subset of operations is different from the first subset of operations. Transactions being processed with account number B are restricted to operations found in the second subset of operations. It will be recognized that there may be some overlap of operations between the first and second subset of operations. Also, if many account numbers are used, there may be account numbers that include the same subsets of operations. However, for purposes of discussion, it is assumed that the first subset and the second subset of operations are different in that at least one operation is included in the first subset that is not included in the second subset.

A user associated with account 102 may be any entity. For example, a user may be a person, an application, a corporation, or any other entity capable of providing an account number to a party for some purpose. It will be understood that when a user is described, the user may be any entity and not just a person who owns or is the account holder of account 102.

A user associated with account 102 may provide different account numbers to different parties. A user may decide operations in which a party should be given access. For example, if a user only desires party A to be able to deposit money into account 102, the user provides account number A, which only allows deposit operations. Also, if the user desires party B to have full access to account 102, the user may provide account number B, which allows full access. Accordingly, if party A is provided account number A, party A cannot use account number A to perform any operations outside of the first subset of operations. Thus, party A may not fraudulently perform operations using account 102, such as withdrawing money from account 102.

Account numbers A and B are then stored in a database 104 and are associated with the subsets of operations. For example, when account number A is used in a transaction, the subset of operations that is associated with it can be retrieved from database 104.

Figure 2:
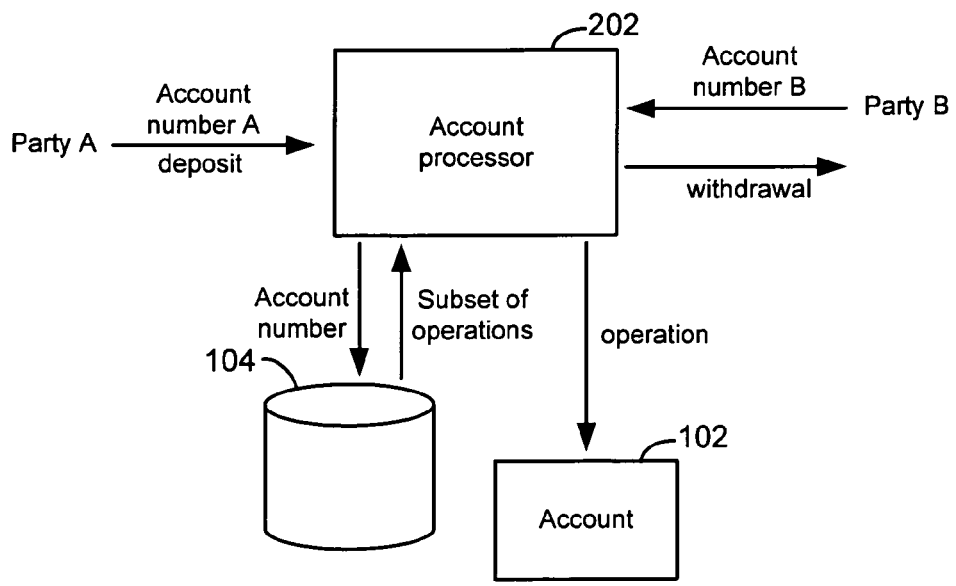
FIG. 2 depicts a transaction between a party A or a party B according to one embodiment of the present invention.

FIG. 2 depicts a transaction between a party A or a party B according to one embodiment of the present invention. As shown, party A requests a transaction with account number A. In one embodiment, a deposit operation is requested for account number A. Account processor 202 receives the transaction request and determines from database 104 which subsets of operations are associated with account number A. In one example, the subset of operations includes deposit operations. Thus, the deposit operation is in the subset of operations. Account processor 202 may thus authorize the operation and process the transaction. If the deposit operation is not in the subset of operations, account processor 202 may deny the transaction.

If, for example, a withdrawal operation is requested for account number A. Account processor 202 receives the transaction request and retrieves a subset of operations associated with account number A. The subset of operations may include only deposit operations. Accordingly, the withdrawal operation is not in the subset of operations and account processor 202 may deny the transaction.

In another example, party B requests a transaction using account number B. In the transaction, an operation, such as a withdrawal operation, is requested. Account processor 202 receives the transaction request and retrieves a subset of operations associated with account number B. The subset of operations may include all operations (full access). Accordingly, the withdrawal operation is in the subset of operations and account processor 202 processes the transaction.

Accordingly, party A is restricted to the operations found in the subset of operations. Thus, for example, party A can only deposit into account 102 and cannot withdraw any money from account 102. Additionally, because account number A cannot be used to derive account number B, there is no way for party A to withdraw money from account 102 because operations outside the subset of operations are not allowed. Thus, the user may safely provide account number A to party A without being susceptible to fraud for operations outside the subset of operations associated with account number A. Accordingly, a user can selectively provide account numbers to parties depending on the types of transactions the user wants to allow a party to perform with account 102.

In one embodiment, entities that conduct transactions with account 102 do not need to change any existing infrastructure to include new payment protocols or wire transfer systems, etc. For example, the existing wire transfer (automated clearing house) systems and protocols may be used to process a transaction using the account numbers. The only change that may be made is at the financial institution is to understand the different account numbers and associate the account numbers with the different subsets of operations. The transactions can thus be handled in the same way as other transactions with accounts with only a single account number.

Figure 3:
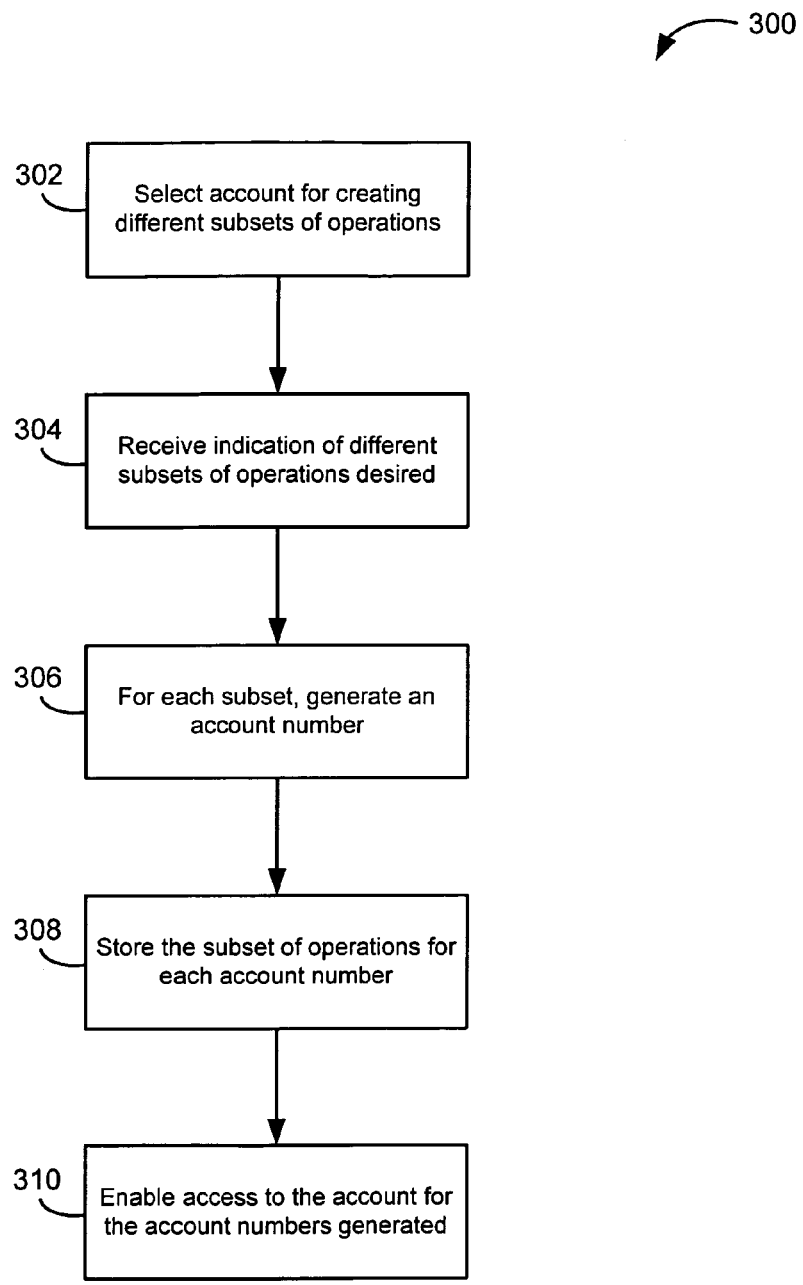
FIG. 3 depicts simplified flowchart of a method for creating different account numbers that are restricted to different subsets of operations according to one embodiment of the present invention.

FIG. 3 depicts simplified flowchart 300 of a method for creating different account numbers that are restricted to different subsets of operations according to one embodiment of the present invention. In step 302, an account 102 is selected for creating different subsets of operations. For example, the account 102 may be a savings account, checking account, etc.

In step 304, an indication of different subsets of operations that are desired is received. For example, a user may specify that a first subset of operations and a second subset of operations are desired. For example, the first subset of operations may be restricted to deposit only operations, and the second subset of operations may be operations for full access to account 102.

In step 306, for each subset of operations, an account number is generated. In one embodiment, the account numbers cannot be derived from each other.

In step 308, the subset of operations for each account number is stored and associated with the account number. Accordingly, account 102 may have many account numbers associated with it and a different subset of operations that it is restricted to each account number.

In step 310, access to account 102 for the account numbers generated is enabled. Thus, when any of the account numbers is provided in a transaction request, account 102 is determined and accessed for that transaction request. Accordingly, transactions for different account numbers may be processed using account 102. But, each account number may be restricted to different subsets of operations.

Figure 4:
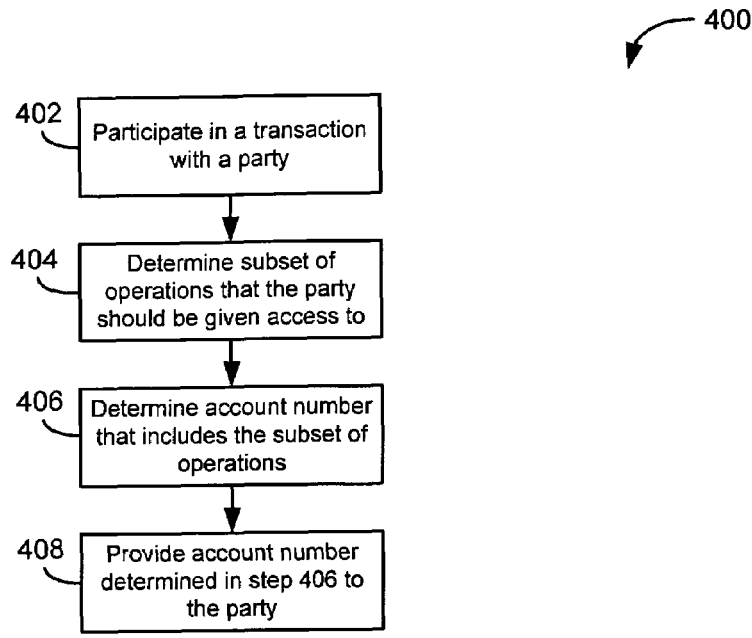
FIG. 4 depicts simplified flowchart of a method for protecting access to an account 102 in a transaction with a party according to one embodiment of the present invention.

FIG. 4 depicts simplified flowchart 400 of a method for protecting access to an account 102 in a transaction with a party according to one embodiment of the present invention. In step 402, account processor 202 participates in a transaction with a party. For example, the transaction may be an on-line shopping transaction with a website operator. Also, a transaction may be where a party may need to later request a withdrawal or deposit of money into account 102.

In step 404, the user determines a subset of operations in which the party should be given access. For example, if the user desires that a party should only be able to deposit money into account 102, then a subset of operations that includes only deposit operations should be chosen.

In step 406, an account number that includes a subset of operations determined in step 404 is determined. For example, an account number that is associated with a subset of operations that includes deposit-only operations may be chosen.

In step 408, the account number determined in step 406 is provided to the party. Accordingly, the party only has access to that account number. Thus, the subset of operations that the user desires to give the party access to can be used. This is because the party only has the account number and the party can perform operations in the subset of operations associated with that account number. The party cannot derive other account numbers from the account number provided and thus, cannot extend access to account 102 by providing another account number. Accordingly, the party is restricted to using the subset of operations that the account number is associated with.

Figure 5:
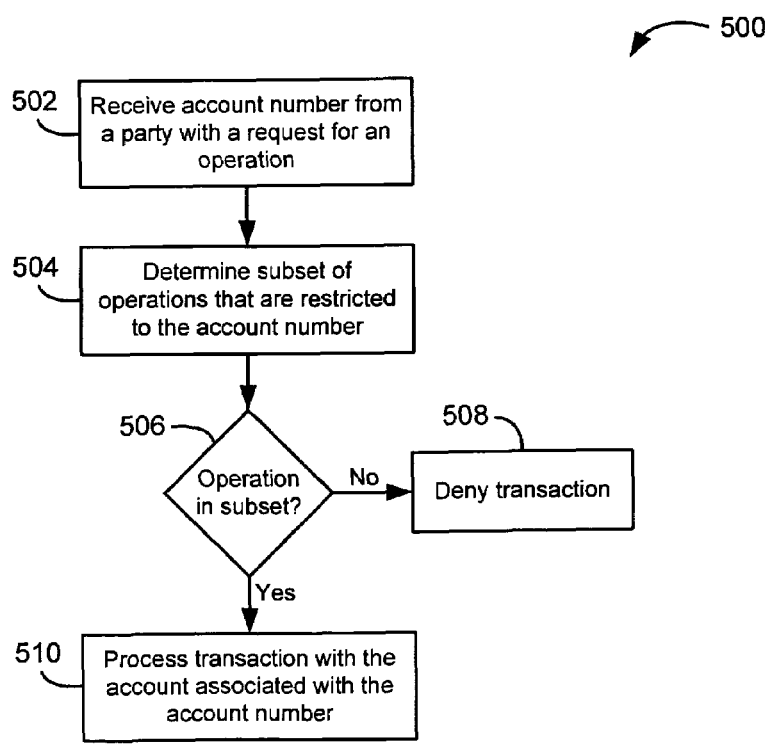
FIG. 5 depicts a simplified flowchart of a method for processing transactions according to one embodiment of the present invention.

FIG. 5 depicts a simplified flowchart 500 of a method for processing transactions according to one embodiment of the present invention. In embodiment, a party has been provided an account number by a user. For example, the process discussed in FIG. 4 may have been used to provide an account number to the party.

In step 502, an account number is received from a party with a request for an operation. For example, the request may be for a deposit or withdrawal.

In step 504, the subset of operations that are restricted to the account number is determined. For example, information in database 104 may be retrieved that indicates a subset of operations that are associated with the account number.

In step 506, it is determined if the operation is in the subset of operations retrieved. For example, if an account number is associated with a subset of operations that only includes deposit operations, then a withdrawal operation is not in the subset of operations.

In step 508, if the operation is not in the subset of operations, the transaction may be denied.

In step 510, if the operation is in the subset of operations, the transaction may be processed with an account 102 that is associated with the account number. It should be noted that this process may be repeated with the same account 102 for other requests with a second account number. The second account number may have another subset of operations associated with it and an operation, if it is in that subset, is processed for the same account 102.

The following are examples using embodiments of the present invention. In one example, an account holder C has a bank account. Typically, the same bank account is used for depositing money as well as for withdrawing money. If a person F owes account holder C money, person F may promise to pay the money directly to the account of C. Typically, C may provide the account details (such as the account number) enabling full access to F. In this case, F may use this information to gain illegal financial gains. If C, however, creates multiple account numbers that are associated with different subsets of operations for the bank account, C may protect his/her bank account. For example, C may create two account numbers, one that allows full access (i.e., allows all operations) and one that allows only deposit operations. If F owes C money, F may be supplied with the information for the deposit-only account. Accordingly, F is restricted to operations that are deposits. If F attempts to withdraw money or perform any operations other than deposit operations, the transactions may be denied. Accordingly, the bank account of C is protected from fraud because F is restricted to operations that C explicitly enabled F to perform.

In another example, a customer C may have a credit card account. If F owes C money, F may be willing to transfer balances from F's account to C's account. Potentially, if C supplied F with account information with full access, F could use this information fraudulently. However, if C had an account number for full access and an account number only for purposes of transferring balances, the account number for transferring balances may be provided to F.

Accordingly, F may only transfer money into C's account and, if F attempts to withdraw money from C's account, the transaction may be denied because the operation is not in the subset of operations associated with the account number given to F.

In yet another example, an account 102 may be an on-line depository (e.g., for intellectual ideas). For example, an office that processes patent applications is one depository. The depository may be in charge of evaluating the ideas (for funding, publication, patent issue, etc.). If access to a website for the on-line depository is not restricted, then some parties may have access to other people's ideas. For example, a party may fraudulently download information submitted by other parties. However, if a website is created that is associated with a subset of operations that allows uploads only, then an identifier for that website may be provided to certain users. Thus, the users may only upload information from the site, and cannot download any information.

Accordingly, a user may protect an account from fraudulent activity and abuse by giving access to certain subsets of operations to different parties. Embodiments of the present invention do not require that different accounts be created. Rather, different account numbers for the same account may be used. The different account numbers may be provided based on the subsets of operations that a user wants a party to have access.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of protecting an account, the method comprising:
    creating a first account number and a second account number for an entity, wherein the first account number and second account number are associated with an account associated with the entity;
    associating the first and second account numbers with the account;
    storing an indication of a first subset of operations that should be restricted to the first account number;
    storing an indication of a second subset of operations that should be restricted to the second account number;
    enabling access to the account using the first subset of operations if the first account number is received in a transaction request;
    enabling access to the account using the second subset of operations if the second account number is received in a transaction request;
    receiving a first request for an operation for the first account number;
    using the first account number to determine the first subset of operations;
    determining if the operation is in the stored first subset of operations;
    if the operation is in the first subset of operations, processing the request with the account associated with the first and second account numbers;
    receiving a second request for a second operation for the second account number;
    using the second account number to determine the second subset of operations;
    determining if the second operation is in the stored second subset of operations; and
    if the second operation is in the second subset of operations, processing the second request with the account associated with the first and second account numbers.

2. The method of claim 1, wherein if the operation is not in the second subset of operations, denying the request.

* * * * *